(12) United States Patent  
Wu

(10) Patent No.: US 8,615,153 B2  
(45) Date of Patent: Dec. 24, 2013

(54) MULTI-MEDIA DATA EDITING SYSTEM, METHOD AND ELECTRONIC DEVICE USING SAME

(75) Inventor: Chuan-Feng Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 790 days.

(21) Appl. No.: 12/641,334

(22) Filed: Dec. 18, 2009

(65) Prior Publication Data

US 2010/0278505 A1 Nov. 4, 2010

(30) Foreign Application Priority Data

Apr. 29, 2009 (CN) .......................... 2009 1 0301977

(51) Int. Cl.
*H04N 5/765* (2006.01)
*H04N 5/931* (2006.01)

(52) U.S. Cl.
USPC .......................................... 386/200; 386/204

(58) Field of Classification Search
None
See application file for complete search history.

(56) References Cited

U.S. PATENT DOCUMENTS

| | | | | |
|---|---|---|---|---|
| 5,764,852 A * | 6/1998 | Williams | ...................... | 704/243 |
| 5,870,708 A | 2/1999 | Stewart | | |
| 5,986,692 A * | 11/1999 | Logan et al. | ..................... | 725/35 |
| 7,460,731 B2 * | 12/2008 | Senftner et al. | ............... | 382/284 |
| 8,245,252 B2 * | 8/2012 | Gee et al. | ........................ | 725/36 |

FOREIGN PATENT DOCUMENTS

CN 1636388 A 7/2005
CN 101030369 A 9/2007

\* cited by examiner

*Primary Examiner* — William C Vaughn, Jr.
*Assistant Examiner* — Oluwaseun A Adegeye
(74) *Attorney, Agent, or Firm* — Altis Law Group, Inc.

(57) ABSTRACT

The present disclosure provides a multi-media data editing system for editing a multi-media data. The multi-media data editing system includes a sample memory and a processor. The sample memory stores a plurality of undesired voice samples. The processor includes a voice obtaining module, a voice comparing module, and a voice editing module. The voice obtaining module is configured for obtaining an audio data from the multi-media data. The voice comparing module is configured for comparing the obtained audio data with the plurality of undesired voice samples looking for a match. The voice editing module is configured for editing the audio data during the audio data matched with undesired voice samples. The present disclosure also provides a multi-media data editing method. And the present disclosure provides an electronic device using the multi-media data editing system.

14 Claims, 2 Drawing Sheets

MULTI-MEDIA DATA EDITING SYSTEM, METHOD AND ELECTRONIC DEVICE USING SAME

BACKGROUND

1. Technical Field

The present disclosure relates to electronic devices and, particularly, to an electronic device with a multi-media data editing system which can automatically edit audio and video data according to predetermined parameters.

2. Description of Related Art

A conventional digital video camera is customarily adapted for recording both video and audio data simultaneously via a recording medium such as a compact disc. Should some undesirable phrases and/or actions be recorded, then users may have to use some complicated means to edit the recording.

What is needed, therefore, is a multi-media data editing system and a method used in an electronic device capable of automatically editing audio data to overcome or at least alleviate the above-described problem.

BRIEF DESCRIPTION OF THE DRAWING

Many aspects of the present multi-media data editing system, method, and an electronic device can be better understood with reference to the following drawing. The components in the drawing are not necessarily drawn to scale, the emphasis instead being placed upon clearly illustrating the principles of the present multi-media data editing system, method, and an electronic device using the same.

DETAILED DESCRIPTION

Embodiments of the present disclosure will now be described in detail below, with reference to the accompanying drawing.

Figure 1:
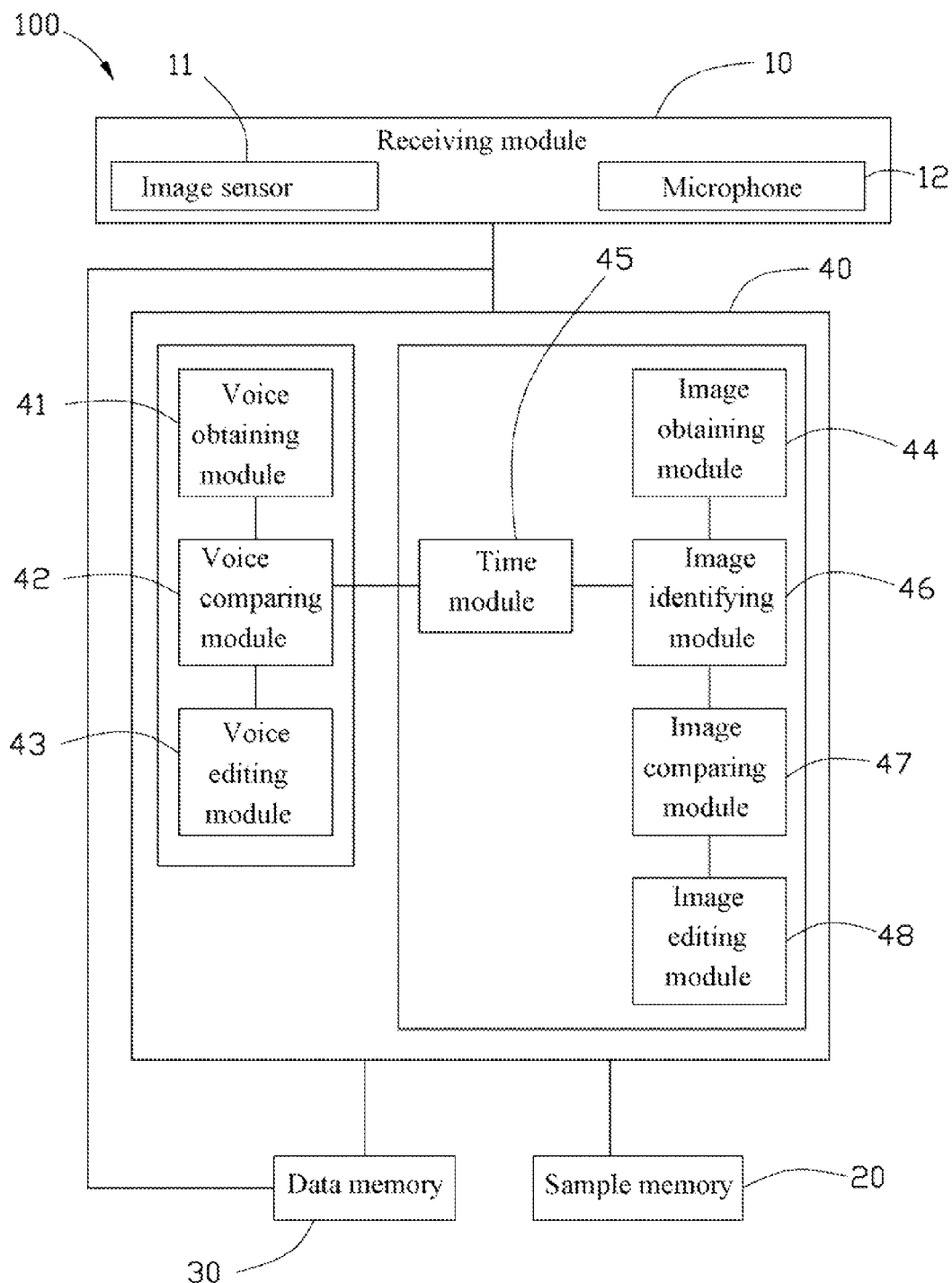
FIG. 1 is a functional block diagram of an electronic device according to an exemplary embodiment.

Referring to FIG. 1, an electronic device 100, according to an exemplary embodiment, is shown. The electronic device 100 can be a digital camera, a digital video camera, a digital television, an Internet protocol television, or a cell phone. In the present embodiment, the electronic device 100 is a digital video camera. The electronic device 100 includes a receiving module 10, a sample memory 20, a data memory 30, and a processor 40.

The receiving module 10 is configured for receiving multi-media data. In the present embodiment, the receiving module 10 includes an image sensor 11 and a microphone 12. The image sensor 11 is configured for capturing video. The microphone 12 is configured for recording audio. Furthermore, in other embodiments, the receiving module 10 can also include a receiver for receiving a digital signal and a decoder for translating the digital signal into audio/video data when the electronic device 100 is a digital television.

The sample memory 20 stores a number of prerecorded undesired voice samples and video samples. The undesired video samples can be of mouth-shapes, gestures, and text. In the present embodiment, the video sample is of a mouth speaking an undesirable word.

The processor 40 includes a voice obtaining module 41, a voice comparing module 42, a voice editing module 43, an image obtaining module 44, a time module 45, an image identifying module 46, an image comparing module 47, and an image editing module 48.

The voice obtaining module 41 is configured for obtaining audio data from the audio/video data transmitted from the receiving module 10.

The voice comparing module 42 is configured for using speech recognition technology to compare the obtained audio data with the undesired voice samples looking for a match. If a match is found, the voice comparing module 42 sends a first signal to the voice editing module 43. Otherwise, the voice comparing module 42 does not send any signal to the voice editing module 43.

The voice editing module 43 is configured for editing out any found undesired voice portions from the obtained audio data via mute technology or replacing the audio data with other audio data. To be specific, the voice editing module 43 can calculate the size of the audio data portion which matches one of the undesired voice samples. Then the voice editing module 43 can delete that portion from the obtained audio data. The voice editing module 43 generates silent data of a size corresponding to the deleted portion of audio data. The voice editing module 43 inserts the silent data into the gap left by the deletion. Furthermore, in other embodiments, the voice editing module 43 can also generate beeping sound data of a size corresponding to the gap. In the present embodiment, the voice editing module 43 generates silent data for the gap. The voice editing module 43 stores the edited audio data in the data memory 30.

Sometimes, the undesired phrase is visually apparent in the video by how a person mouths the phrase, therefore it may desirable to edit that portion of video content as well. The following paragraphs will disclose how the video data is automatically edited.

The image obtaining module 44 is configured for obtaining video data from the audio/video data transmitted from the receiving module 10. In the present embodiment, the image obtaining module 44 obtains the video data from the audio/video data from the receiving module 10 when the voice obtaining module 41 is obtaining the audio data.

The time module 45 is configured for obtaining the location of the undesired portion of audio/video data according to time elapsed from beginning of the data to beginning point of undesired portion.

The image identifying module 46 is configured for obtaining a characteristic pattern of the obtained video data at the time the undesired audio data portion occurs. The characteristic pattern can be how a mouth moves in the video, a gesture, or text. In the present embodiment, the image identifying module 46 identifies a mouth and its movement using face recognition technology as the characteristic pattern.

The image comparing module 47 is configured for comparing the characteristic pattern of the obtained video data with the undesired video samples in the memory 20 to find a match. If there is a match, the image comparing module 47 sends a second signal to the image editing module 48, otherwise the image comparing module 47 does not send any signal to the image editing module 48.

The image editing module 48 is configured for editing out any found undesired image portions from the obtained video data. In the present embodiment, when the image editing module 48 receives the second signal, the image editing module 48 edits the video data. The image editing module 48 can replace the video data with another video data. To be specific, the image editing module 48 can calculate the size of the video data portion which includes the characteristic pattern matching one of the undesired video samples. Then the image editing module 48 can delete that portion from the obtained audio data. The image editing module 48 generates blank image data of a size corresponding to the deleted portion of video data. The image editing module 48 inserts the blank image data into the gap left by the deletion. Furthermore, in other embodiments, the image editing module 48 can also generate mosaic video data of a size corresponding to the gap. In the present embodiment, the voice editing module 43 generates mosaic video data for the gap. The image editing module 48 stores the edited video data in the data memory 30.

The data memory 30 is configured for storing the audio/video data from the receiving module 10 and the audio/video data edited by the voice editing module 43 and the image editing module 48.

Figure 2:
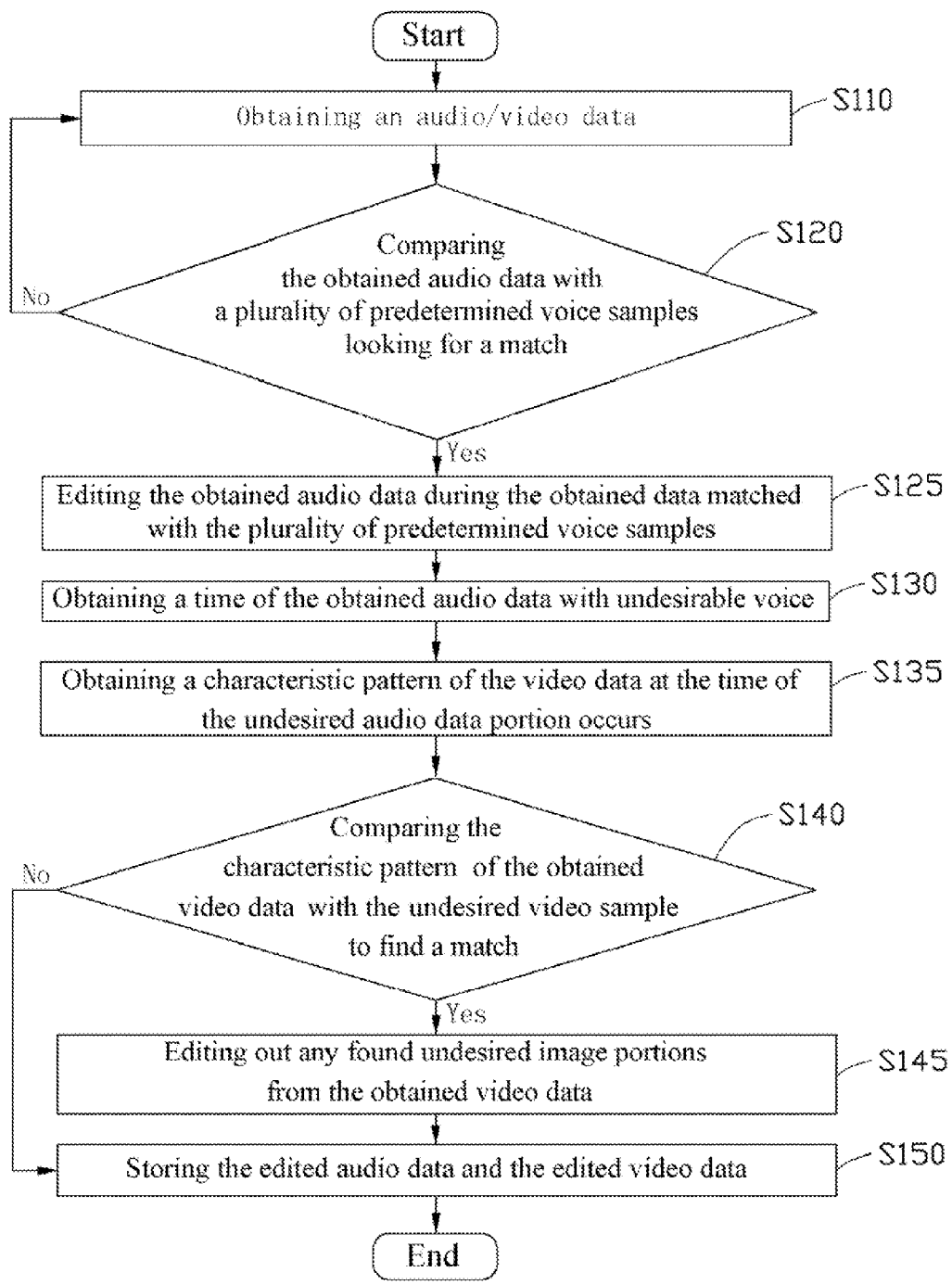
FIG. 2 is a flowchart of a multi-media data editing method according to an exemplary embodiment.

Referring to FIG. 2, a multi-media data editing method of the electronic device 100 is also provided. The method includes the following steps.

Step S110, obtaining an audio/video data. In the present embodiment, the voice obtaining module 41 is configured for obtaining the audio data from the audio/video data of the receiving module 10. The image obtaining module 44 obtains the video data from the receiving module 10.

Step S120, comparing the obtained audio data with a plurality of predetermined voice samples looking for a match. In the present embodiment, the voice comparing module 42 uses speech recognition technology to compare the obtained audio data with the undesired voice samples looking for a match. If a match is found, the voice comparing module 42 sends a first signal to the voice editing module 43. Otherwise, the voice comparing module 42 dose not send any signal to the voice editing module 43. In the present embodiment, if the audio data includes undesired voice, then the electronic device 100 performs step S125. If the audio data do not include undesired voice, then the electronic device 100 performs step S110.

Step S125, editing the obtained audio data during the obtained data matched with the plurality of predetermined voice samples. In the present embodiment, if the voice editing module 43 receives the first signal, the voice editing module 43 will edit the audio data. The voice editing module 43 edit out any found undesired voice portions from the obtained audio data via mute technology or replacing the audio data with other audio data. To be specific, the voice editing module 43 can calculate the size of the audio data portion which matches one of the undesired voice samples. Then the voice editing module 43 can delete that portion from the obtained audio data. The voice editing module 43 generates silent data of a size corresponding to the deleted portion of audio data. The voice editing module 43 inserts the silent data into the gap left by the deletion. Furthermore, in other embodiments, the voice editing module 43 can also generate beeping sound data of a size corresponding to the gap. In the present embodiment, the voice editing module 43 generates silent data for the gap.

Step S130, obtaining a time of the obtained audio data with undesired voice. In the present embodiment, the time module 45 obtains location of the undesired portion of audio/video data according to time elapsed from beginning of the data to beginning point of undesired portion.

Step S135, obtaining a characteristic pattern of the video data at the time of the undesired audio data portion occurs. The characteristic pattern can be how a mouth moves in the video, a gesture, or text. In the present embodiment, the image identifying module 46 identifies a mouth and its movement using face recognition technology as the characteristic pattern.

Step S140, comparing the characteristic pattern of the obtained video data with the undesired video sample to find a match. In the present embodiment, the image comparing module 47 is configured for comparing the characteristic pattern of the obtained video data with the undesired video samples in the memory 20 to find a match. If there is a match, the image comparing module 47 sends a second signal to the image editing module 48, otherwise the image comparing module 47 does not send any signal to the image editing module 48. In the present embodiment, if there is a match, then the electronic device 100 performs step S145. If the characteristic pattern of the obtained video data do not match with the undesired video sample, then the electronic device 100 performs step S150.

Step S145, editing out any found undesired image portions from the obtained video data. In the present embodiment, when the image editing module 48 receives the second signal, the image editing module 48 edits the video data. The image editing module 48 can replace the video data with another video data. To be specific, the image editing module 48 can calculate the size of the video data portion which includes the characteristic pattern matching one of the undesired video samples. Then the image editing module 48 can delete that portion from the obtained audio data. The image editing module 48 generates blank image data of a size corresponding to the deleted portion of video data. The image editing module 48 inserts the blank image data into the gap left by the deletion. Furthermore, in other embodiments, the image editing module 48 can also generate mosaic video data of a size corresponding to the gap. In the present embodiment, the voice editing module 43 generates mosaic video data for the gap. The image editing module 48 stores the edited video data in the data memory 30.

Step S150, storing the edited audio data and the edited video data. In the present embodiment, the data memory 30 stores the audio/video data from the receiving module 10 and the audio/video data edited by the voice editing module 43 and the image editing module 48.

The electronic device 100 can mute the undesired voice and blur the undesired image.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A multi-media data editing system for editing a multi-media data, the multi-media data editing system comprising:
 a sample memory storing a plurality of undesired voice samples and a plurality of undesired video samples;
 a processor comprising:
  a voice obtaining module configured to obtain audio data from the multi-media data;
  a voice comparing module configured to compare the obtained audio data with the plurality of undesired voice samples looking for a match;
  a voice editing module configured to edit out any found undesirable voice portions from the obtained audio data during the audio data matched with undesired voice samples;
  an image obtaining module configured to obtain video data from the multi-media data;
  a time module configured to obtain a time of the audio data with the undesired voice;
  an image identifying module configured to obtain a characteristic pattern of the obtained video data at the time the undesired audio data portion occurs, the characteristic pattern selected one of a mouth movement in the video data, a gesture and a text;

an image comparing module configured to compare the characteristic pattern of the obtained video data with the plurality of undesired video samples to find a match; and an image editing module configured to edit the obtained video data during the characteristic pattern of the obtained video data matched with the plurality of undesired video samples.

2. The multi-media data editing system as claimed in claim 1, wherein the voice editing module uses mute technology or replaces the audio data with another audio data.

3. The multi-media data editing system as claimed in claim 1, wherein the image editing module replaces the video data with another video data.

4. The multi-media data editing system as claimed in claim 1, wherein the multi-media data editing system further comprising a data memory, the data memory is configure for storing the edited video data and the edited audio data.

5. The multi-media data editing system as claimed in claim 1, wherein the voice editing module calculates the size of each undesirable voice portion which matches one of the undesired voice samples and deletes that undesirable voice portion from the obtained audio data, the voice editing module generates silent data which has a size corresponding to the deleted voice portion and inserts the silent data into the gap left by the deletion.

6. A multi-media data editing method for editing a multi-media data, the multi-media data editing method executed by a processor and comprising:

obtaining an audio data from the multi-media data;

comparing the obtained audio data with a plurality of predetermined voice samples looking for a match;

editing the obtained audio data during the obtained data matched with the plurality of predetermined voice samples;

obtaining a video data from the multi-media data;

obtaining a time of the obtained audio data with undesired voice;

obtaining a characteristic pattern of the obtained video data at the time of the undesired audio data portion occurs, the characteristic pattern selected one of a mouth movement in the video data, a gesture and a text;

comparing the characteristic pattern of the obtained video data with a plurality of predetermined video samples to find a match; and editing the obtained video data during the characteristic pattern of the obtained video data matched with the plurality of predetermined video samples.

7. The multi-media data editing method as claimed in claim 6, wherein the audio data matched with the predetermined voice samples is processed via mute technology or replacing with another audio data.

8. The multi-media data editing method as claimed in claim 6, wherein the video data matched with the predetermined video samples is replaced with another video data.

9. The multi-media data editing method as claimed in claim 6, wherein the characteristic pattern is one of a mouth movement in the video data, a gesture and a text.

10. An electronic device comprising:

a receiving module configured to receive a multi-media data;

a sample memory configured to store a plurality of undesired voice samples and a plurality of undesired video samples;

a processor comprising:

a voice obtaining module configured to obtain audio data from the multi-media data;

a voice comparing module configured to compare the obtained audio data with the plurality of undesired voice samples looking for a match;

a voice editing module configured to edit out any found undesirable voice portions from the obtained audio data during the audio data matched with undesired voice samples;

an image obtaining module configured to obtain video data from the multi-media data;

a time module configured to obtain a time of the audio data with the undesired voice;

an image identifying module configured to obtain a characteristic pattern of the obtained video data at the time the undesired audio data portion occurs, the characteristic pattern selected one of a mouth movement in the video data, a gesture and a text;

an image comparing module configured to compare the characteristic pattern of the obtained video data with the plurality of undesired video samples to find a match; and an image editing module configured to edit the obtained video data during the characteristic pattern of the obtained video data matched with the plurality of undesired video samples.

11. The electronic device as claimed in claim 10, wherein the voice editing module uses mute technology or replaces the audio data with another audio data.

12. The electronic device as claimed in claim 10, wherein the image editing module replaces the video data with another video data.

13. The electronic device as claimed in claim 10, wherein the electronic device further comprises a data memory to store the edited video data and the edited audio data.

14. The electronic device as claimed in claim 10, wherein the voice editing module calculates the size of each undesirable voice portion which matches one of the undesired voice samples and deletes that undesirable voice portion from the obtained audio data, the voice editing module generates silent data which has a size corresponding to the deleted voice portion and inserts the silent data into the gap left by the deletion.

* * * * *